United States Patent [19]

Ehrola

[11] Patent Number: 5,026,005
[45] Date of Patent: Jun. 25, 1991

[54] METHOD AND APPARATUS FOR REEL-UP OF A PAPER WEB

[75] Inventor: Juha Ehrola, Jyväskylä, Finland

[73] Assignee: Valmet Paper Machinery Inc., Finland

[21] Appl. No.: 431,937

[22] Filed: Nov. 6, 1989

[30] Foreign Application Priority Data

Nov. 17, 1988 [FI] Finland ................................ 885338

[51] Int. Cl.$^5$ .................... B65H 18/16; B65H 75/18; B30B 3/04
[52] U.S. Cl. .................................. 242/65; 242/72 R; 242/73; 226/191; 100/162 B
[58] Field of Search .................. 242/65, 66, 72 R, 73; 100/35, 162 B; 226/191, 192

[56] References Cited

U.S. PATENT DOCUMENTS

| | | | |
|---|---|---|---|
| 3,599,889 | 8/1971 | Pfeiffer | 242/66 |
| 3,837,593 | 9/1974 | Dörfel | 242/66 |
| 3,854,646 | 12/1974 | Dorfel | 242/66 X |
| 4,399,747 | 8/1983 | Schiel et al. | 100/162 B |
| 4,414,890 | 11/1983 | Schiel et al. | 100/162 B |
| 4,432,277 | 2/1984 | Hartmann | 100/162 B X |
| 4,502,312 | 3/1985 | Marchioro | 100/162 B X |
| 4,634,068 | 1/1987 | Malkki et al. | 242/65 |
| 4,709,571 | 12/1987 | Guttinger | 100/162 B X |
| 4,793,250 | 12/1988 | Niskanen | 100/35 |

Primary Examiner—Stuart S. Levy
Assistant Examiner—Joseph A. Rhoa
Attorney, Agent, or Firm—Steinberg & Raskin

[57] ABSTRACT

A method and apparatus for reel-up of a paper web, wherein a roll is formed around a reeling drum or in another embodiment of the invention on the support of carrier rolls or carrier belts, and wherein a reeling cylinder is used to form a reeling nip for contacting the roll which is to be produced during passage of the paper web through the reel-up apparatus, includes a center axis and a cylinder mantle mounted for revolution around the axle comprised by the reeling cylinder. A method and apparatus for reel-up of a paper-web includes hydraulic loading elements for adjusting deflection of the cylinder mantle such that distribution of line pressure in the reeling nip, in its axial direction is controlled, e.g. maintained to be substantially uniform.

6 Claims, 8 Drawing Sheets

METHOD AND APPARATUS FOR REEL-UP OF A PAPER WEB

BACKGROUND OF THE INVENTION

The present invention relates generally to a method for reel-up of a paper web and a reel-up apparatus for carrying out said method.

The present invention is particularly directed to improvements over conventional methods and devices for reel-up of a paper web which include reduction of web breakage due to wrinkling, sliding at the reeling nip, and an improved distribution of hardness throughout the layers of the roll.

The present invention concerns a method for reel-up of a paper web, wherein a roll is formed around a reeling drum, or in another embodiment of the invention on the support of carrier rolls or carrier belts, and wherein a reeling cylinder is used to form a reeling nip for contacting the roll to be produced during passage of the paper web through a reel-up apparatus.

The present invention further provides a reel-up apparatus intended for carrying out the aforementioned method for paper web reel-up or its equivalent. The reel-up apparatus comprises a reeling cylinder or cylinders wherein the cylinder or cylinders are mounted in connection with the frame construction of the reel-up apparatus and having frame construction supporting members fitted thereon to provide support for the reeling drum around which the roll to be produced is wound as the roll makes its passage through a reeling nip which is formed between the roll and a reeling cylinder.

A Pope-type reel-up is commonly used for the reel-up of a paper web during its passage, e.g., out of a paper machine, coating a machine, supercalender, or printing machine. The web is reeled onto a drum to form a roll which is pressed to form a roll which is pressed against the Pope or reeling cylinder, over which the web runs within a certain sector of said cylinder and said cylinder is rotated at the circumferential speed corresponding to the desired web speed. Before passage of the roll through the reel-up is completed, a new drum having been accelerated to the desired running speed can be brought into nip contact with the Pope cylinder so that the new drum also obtains a speed corresponding exactly to the circumferential speed. As soon as the paper roll has reached the desired diameter, it is displaced apart from the Pope cylinder, thereby gradually slowing down its speed of rotation resulting in the formation of a web-loop or open draw between the new reeling drum and the completed roll. Said web-loop is guided, e.g., by means of a compressed-air jet, to be wound around the new reeling drum, whereby it is separated from the completed roll either by a tearing action or in another conventional arrangement it may be cut-off by means of air jets.

At the highest operating speeds, and in particular when LWC and SC-paper qualities are reeled, an important drawback of Pope-type reel-ups for paper machines and the equivalent is the formation of wrinkles which further results in web breakage at the innermost layers of the rolls. The proportion of web breakage occurring may be as much as 2 to 3 percent which is costly and uneconomical. Variations in hardness occurring in the innermost layers of a paper roll are considered to be the main reason for the formation of wrinkles, so called "bugs" in the innermost layers of a paper roll. Variations in hardness are caused largely due to uncontrollable variations in the line pressure formed between the paper roll and the Pope cylinder as well as variations in the tension of the paper web as it is reeled, which will be described in greater detail later.

The distribution of hardness, or radial variation in density, in a paper roll produced by means of a Pope-type reel-up for paper machines is affected mainly by two factors. The first factor is the line pressure created between the reeling cylinder and the paper roll, and the second factor is the tension of the paper web as it is reeled, i.e. for example, the distribution of hardness is affected by the difference in speed between operation of the press section and operation of the reel-up.

It is accordingly an object of the present invention to try to eliminate these drawbacks by controlling the line pressure placed on the reeling nip. Distribution of hardness that is deficient or distribution of hardness that includes portions of discontinuity causes web breakage in subsequent stages of the paper's treatment, or web run and in the worst case tears and folds are formed in the paper web near the bottom of the roll at its innermost layers.

It is a further object of the present invention to eliminate the drawbacks described above, at least in part.

Another drawback in a conventional reel-up is the occurrence of sliding of the paper web as it is rolled against the face of the reeling cylinder. Several factors affect the amount of sliding that occurs including tension of the paper web in the area of the reeling cylinder, the surface pressure resulting from said tension against the face of the reeling cylinder, and line pressure that is produced by the primary and secondary reeling forks on the growing paper roll which is placed in nip contact against the reeling cylinder. Furthermore, the occurrence of sliding is affected by the surface properties of both the paper web which is to be reeled and the surface properties of the reeling cylinders, i.e. by the friction coefficient created between opposing surfaces as they face each other, which is also affected by the moisture content of the paper.

With increased tension of the paper web, the tendency of sliding to slide is reduced because surface pressure of the paper against the reeling cylinder is elevated and frictional forces are increased. An upper tolerance for an increase in tension of the paper web is regulated by tensile strength of the paper so that an increased frequency of web breakage does not occur.

Maintaining line pressure between the forming roll and the reeling cylinder at a sufficiently high and uniform level is achieved with increased difficulty due to the fact that the reeling begins on primary forks placed in their uppermost positions and is continued at a later stage of web passage on secondary forks. The primary forks bring the roll into downwardly inclined contact with the face of the reeling cylinder whereby the roll receives its initial rotating power from the circumferential speed of the reeling cylinder. As the roll becomes larger and the primary forks are gradually placed in their lowest positions, the line pressure between the roll and the reeling cylinder is reduced evenly and steeply, depending on the reduction of the power component resulting from the force of gravity as the position of the growing roll is changed in relation to the reeling cylinder.

Difficulties occur in controlling line pressure between the roll and the reeling cylinder when the growing roll is shifted from primary forks onto secondary forks. In practice, significant variations do occur in line pressure permitting instances of sliding of the paper web on the face of the reeling cylinder, thus resulting in occasional wrinkles in said paper roll in its initial stage of reeling.

Additional occurrences of sliding and wrinkling are a result of varying surface pressure of the paper roll caused by variations in paper tension as the roll is shifted from the primary forks onto the secondary forks.

In the prior art, means of avoiding the problem of sliding and the additional difficulties manifested as a consequence thereof, which are described above, include setting paper or web tension at its upper tolerance as regulated by a differential in speed between the reeling cylinder and the nearest preceding operating device comprised by the reel-up apparatus. As previously stated, limiting factors consist of an increased susceptibility toward web breakage and deterioration of paper quality properties, e.g. tensile strength of the paper is reduced and elongation is also reduced.

As is well known in the art, a second means employed to increase the line pressure between the growing roll and the reeling cylinder to its maximum tolerance makes use of an excessively high loading force applied at the secondary support forks, in particular, to press the roll against the reeling cylinder.

One drawback of this procedure is deterioration of paper qualities such as tensile strength of the paper and elongation which are reduced as was the case when the preceding prior art means for increasing line pressure is employed. A second drawback in the instant case concerns the production of a roll hardness which increases toward the outermost layers of the roll because those layers become packed with an excessive tightness.

SUMMARY OF THE INVENTION

Accordingly, it is an object of the present invention to provide a new and improved method for paper-web reel-up and a new and improved reel-up apparatus for carrying out said method or its equivalent wherein the drawbacks discussed above can be essentially eliminated.

Additionally, it is a particular object of the present invention to provide a method for paper-web reel-up and a reel-up apparatus for carrying out said method which achieves the improvement of higher uniformity throughout the layers of the paper roll resulting in a reduction in web breakage.

In view of achieving the objectives stated above and those that will become more apparent later, a method of operation in accordance with the present invention is mainly characterized by an adjustment of the deflection of the cylinder mantle which revolves around the central axle of the reeling cylinder, and by means of said adjustment, the distribution of line pressure in the reeling nip is controlled in the axial direction.

Additionally, the reel-up apparatus in accordance with the present invention is mainly characterized by the provision of one or several reeling cylinders having means for varying or adjusting the deflection of the cylinder mantle, wherein said means are fitted inside the cylinder mantle of the reeling cylinder and by provision of said means, the distribution of line pressure in said nip means can be controlled during reel-up.

In accordance with the present invention, line pressure in the reeling nip is maintained with substantial uniformity by employment of means for varying or adjusting the deflection of the cylinder mantle such that deflection of the cylinder mantle is controlled during the different stages of reel-up and the desired improvements are achieved. When necessary, the level of line pressure in the reeling nip is adjusted by provision of said means for adjusting cylinder mantle deflection, and wherein said line pressure can also be controlled by the provision of power unit means which act upon the axle journals comprised by the reeling cylinder or reeling drum at both their ends.

Although the invention has been described thus far mainly with reference to Pope-type reel-up devices, it should be emphasized that numerous modifications and variations of the present invention are possible. For example, the invention is also suitable for use with various center driven reel-ups characterized by the provision of carrier rolls or sets of carrier belts. The invention is also suitable for use in reel-ups having two or more reeling nips.

The simultaneous accomplishment of the various advantages enumerated above, usually obtained only by mutually exclusive design variations, indicates a remarkable level of invention.

DETAILED DESCRIPTION OF THE DRAWINGS

A more complete appreciation of the present invention and many of the attendant advantages thereof will be readily understood by reference to the following detailed description when considered in connection with the accompanying drawings, it being understood that the invention is not restricted to the details of the illustrated embodiments wherein.

FIG. A1 illustrates a schematic elevational view of reeling-drum exchange in a prior-art Pope-type reel-up.

FIG. A2 illustrates the distribution of line pressure in a nip in accordance with FIGS. A1 and A3.

FIG. A3 is a vertical sectional view of the reeling-up shown in FIG. A1.

FIGS. B1, B2 and B3 correspond to FIGS. A1, A2 and A3 and illustrate a schematic elevational view of reel-up or a prior-art Pope-type reel-up occurring after the reeling drum has been shifted onto support rails comprised by the reel-up.

DESCRIPTION OF THE PREFERRED EMBODIMENTS

Figure 5:
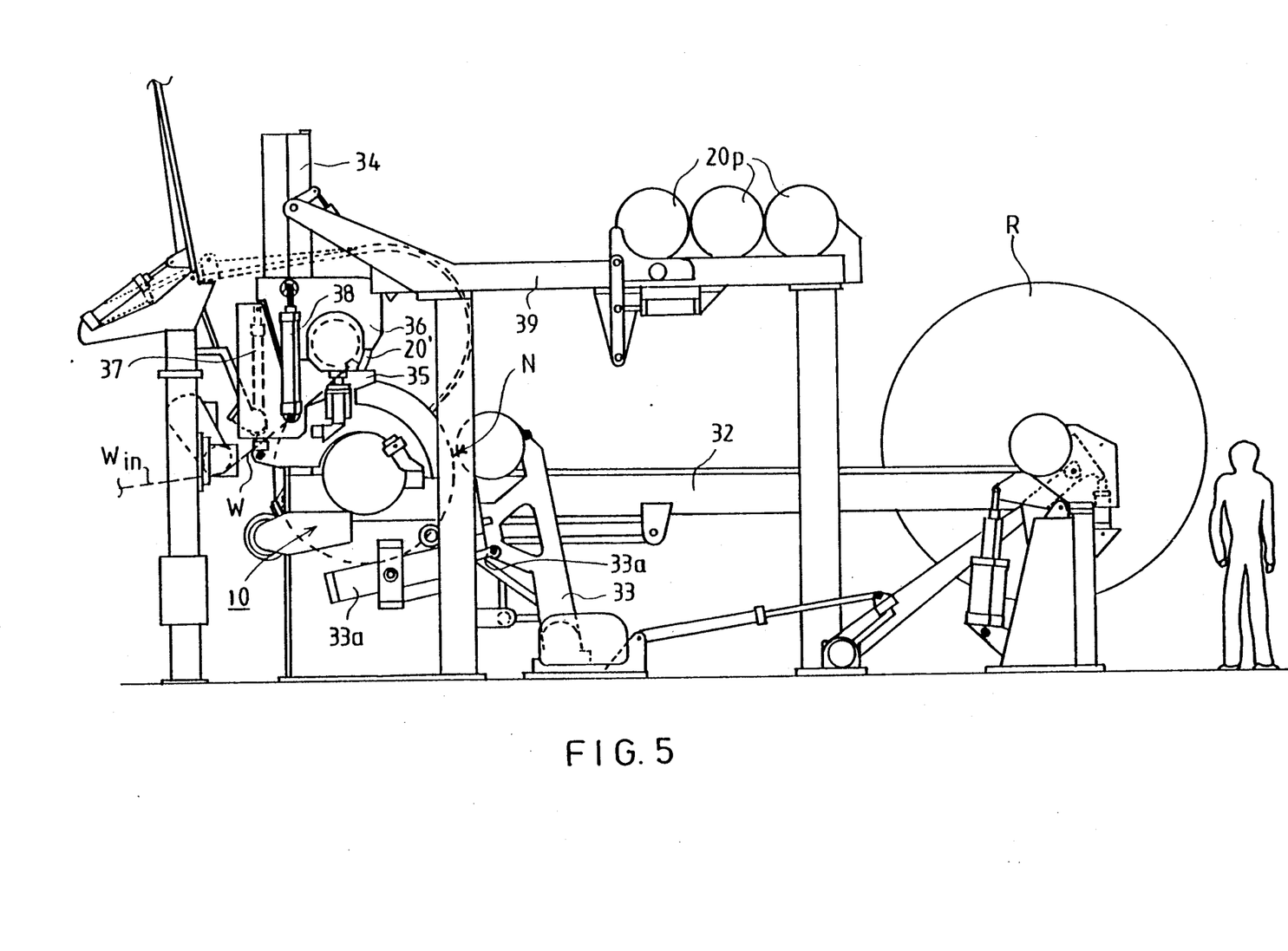
FIG. 5 is a side schematic elevational view for the reel-up in accordance with the present invention illustrating the overall construction of the invention and including its frame parts.

The main construction of the Pope-type reel-up shown in FIG. 5 comprises reeling cylinder 10 having a circumference over which the paper web W runs for a small sector before it is shifted onto the circumference of the paper roll that is formed around the reeling drum 20'.

The drum 20' is supported on two support rails 32 during resting and revolving states, and secondary forks 33 which are loaded by cylinders 33a press said drum toward reeling cylinder 10. The secondary forks 33 also shift the paper roll R apart from the reeling cylinder 10 when the roll is completed and its desired diameter has been reached.

Each completed paper roll R is transferred from a first position along support rails 32 to another position in the reel-up for further treatment, and empty reeling drums 20p are removed from storage rails 39 mounted above the support rails 32 to be exchanged with a completed paper roll in said first position. The reeling drum 20', comprises an exchange device consisting of guides 34 projecting upwards from a side of reeling cylinder 10, said guides being mounted in a rotatable fashion at their lowest ends. Gap sledges having an upper-jaw piece 36 and a lower-jaw piece 35 are mounted for up and down movement along said guide 34. The reeling drum is enclosed at the location of its bearing parts by said elements 35 and 36. Elements 34, 35 and 36 comprise a primary fork. Hydraulic cylinder 38 is used only for opening or closing the gap formed between jaw pieces 35 and 36 due to arrangement of the jaw pieces such that a hydraulic cylinder 37 moves lower-jaw piece 35 which is connected to upper-jaw piece 36 by an intermediate portion of hydraulic cylinder 38.

During the exchange of reeling drum 20' with, empty drum 20p, lower-jaw piece 35 is raised to the level of the end of auxiliary rail 39, which is closest to guides 34, and upper jaw-piece 36 is raised to its uppermost position. Simultaneously, guides 34 are rotated by means of a power unit (not shown in FIG. 5), to such a position that no gap remains between lower-jaw piece 35 and said end of auxiliary rail 39. The reeling drum 20p is allowed to roll into the gap formed by said jaw-pieces, which gap is closed thereafter by lowering upper-jaw piece 36. Then lower-jaw piece 35 is lowered so that the circumference of reeling drum 20' is placed in a face to face proximity with the circumference of reeling cylinder 10, whereupon guides 34 are rotated in the direction of rotation of reeling cylinder 10 further reducing, due to eccentric journalling of guides 34, the distance between drum 20' and cylinder 10 until said drum 20' reaches contact with paper web W running along the circumference of cylinder 10 so that drum 20' reaches a peripheral speed corresponding to the speed of run of the paper web W, thus allowing the transfer of web W onto the new drum as previously described, and further allowing for the reeling drum to be lowered onto support rails 32 in place of the preceding reeling drum which has become a complete roll.

The construction and operation of a reel-up discussed in connection with FIG. 5 is well-known in the art and is set forth as a further illustration of the background of the present invention. It is emphasized that the details of the present invention may be applied to a variety of different reel-up devices whose construction and operation may differ substantially from those described above in connection with FIG. 5.

As an alternative to the Pope-type reel-up illustrated in FIG. 5, the invention may also be applied to a reel-up in accordance with FIG. 6, to be described in more detail later. Or in yet another embodiment, the invention may be applied to a device comprising center driven reel-ups or reel-ups provided with carrier rolls or carrier belts, of the type shown in the Applicant's Finnish Patent Applications Nos. 872223; 87224 and 87225 which are related to the latter modifications described.

In the following, an example of construction and operation of a preferred embodiment of the present invention will be described in greater detail.

In accordance with FIGS. A1 and A3, the reeling cylinder 10' in a prior-art Pope-type reel-up is supported at its axle journals by support forces T. Reeling cylinder 10' is also driven by means of its axle journals.

In FIGS. A1 and A3, the reeling drum 20 is shown during the point of operation of reeling-drum exchange, wherein an empty reeling drum 20 has been brought into connection with reeling cylinder 10' to form a reeling nip $N_1$, at which stage of web run the paper web arriving from the direction $W_{in}$ begins rolling onto empty reeling drum 20 at point $R_o$ which designates the bottom of the paper roll. As is well-known in the prior-art, the reeling drum 20 is supported from both of its axle journals thus relieving most of the weight of the reeling drum 20.

Therefore, distribution $P_1$ of the line pressure at reeling nip $N_1$ becomes similar to that shown in FIG. A2, such that maximum line pressure occurs at the middle of nip $N_1$ and minimum line pressure occurs at both ends of nip $N_1$, at which ends the nip $N_1$ may be open.

In such case, an optimal level and distribution K—K of the line pressure $P_1$ is not achieved.

The prior-art Pope-type reel-up operates in accordance with FIGS. B1, B2 and B3 at a stage of web run when reeling drum 20 has been shifted onto support rails 32 in the Pope-type reel-up shown in FIG. 5, at which time the drum 20 is loaded at its ends by forces $F_2$, toward Pope cylinder 10'. In this case distribution of line pressure is similar to the level and distribution K—K shown in FIG. B2 resulting in maximum line pressure at both ends of reeling nip $N_2$ and minimum line pressure at the middle of nip $N_2$. Also in this case, optimal level and distribution K—K of line pressure $P_2$ is not achieved.

The pressure of reeling drum 20 is approximately 10 kN/m as compared with line pressure during reel-up in the range of 2–3 kN/m. In the case of reeling drum exchange, when the empty reeling drum 20 is placed above Pope cylinder 10, almost the entire pressure of the reeling drum 20 must be relieved at each of its ends. Since the deflection of the reeling drum by its own weight is approximately in the range of 0.3 mm–0.5 mm, it is impossible to obtain a uniform distribution of line pressure. Additionally, when reeling drum 20 rests on support rails 32, it is loaded at its ends with a force of 2–3 kN/m and in particular with an almost empty reeling drum 20, and thus no uniform distribution of line pressure can be obtained; however, line pressure is higher at the ends of the nip. According to the present invention, the Pope cylinder or reeling cylinder 10 used is more particularly described as a variable-crown or profile-adjusted Pope cylinder. As is shown in FIGS. 1C, 3A, 3B, 3C and 2C, the variable-crown or profile-adjusted Pope cylinder 10 comprises a stationary central axle 11 which may support means mounted for rotation around its central axis. The cylinder mantle 12 is mounted for revolution round central axle 11 such that a space 13 is created between the central axle 11 and the mantle 12. A series of loading pistons 14 are fitted into cylinder bores 14s made in the outer circumference of central axle 11 which place a load on glide shoes or loading pistons 14 which form a glide face 15 with the inside face of mantle 12. Glide faces 15 are lubricated by means of a pressure fluid which is also used for loading said loading pistons 14.

Figure 1A:
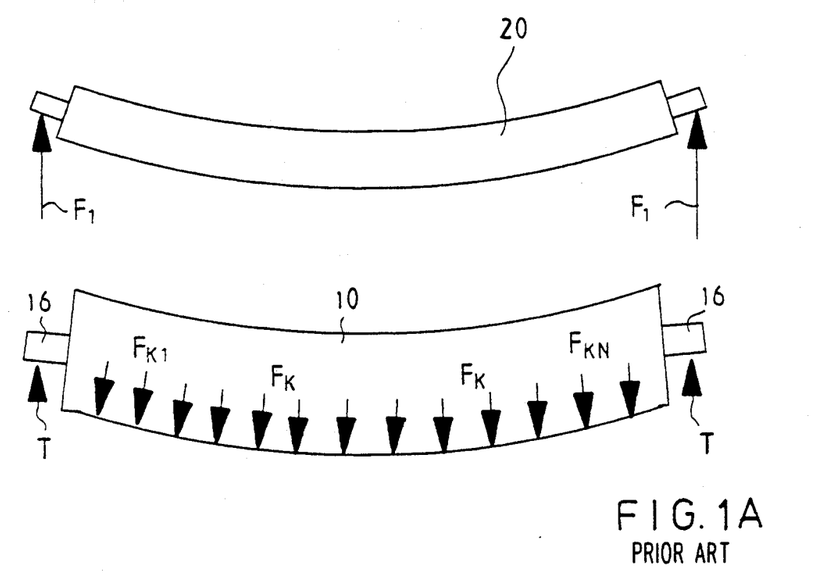
FIG. 1A illustrates the case of reeling drum exchange in a prior art Pope-type reel-up.
Figure 1B:
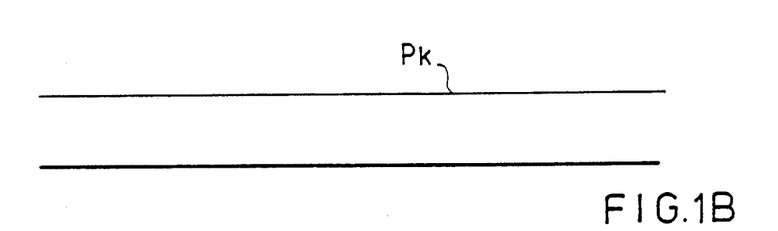
FIG. 1B illustrates the distribution of line pressure in the reeling nip shown in FIG. 1A.
Figure 1C:
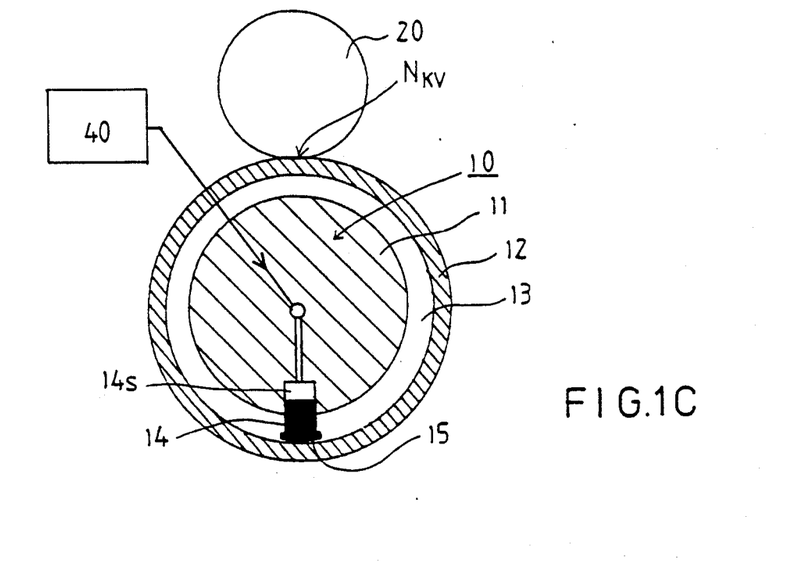
FIG. 1C is a vertical sectional view of the reeling nip shown in FIG. 1A.
Figure 2A:
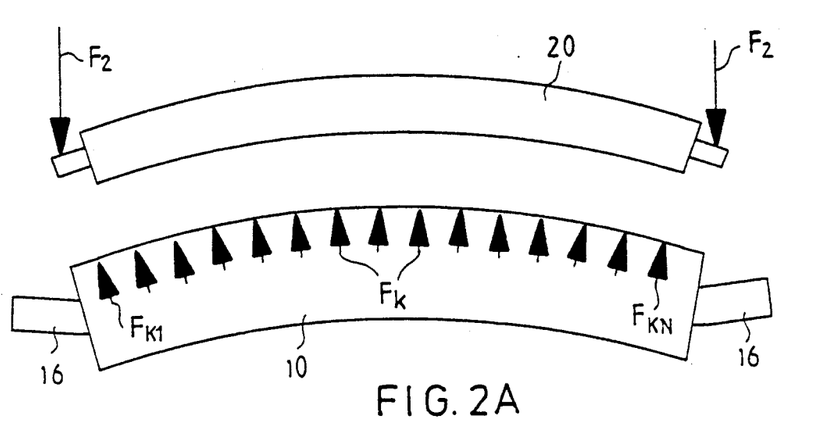
FIG. 2A corresponds to FIG. B1 and illustrates a schematic elevational view for a reel-up apparatus in accordance with the present invention at the stage of reel-up when the reeling drum has been shifted onto support rails comprised by the reel-up.

In FIG. 1C, a source of pressure 40 is illustrated schematically, and said source feeds an adjustable pressure into each cylinder bore or block of bores so that, by means of loading cylinders 14s and glide shoe or loading pistons 14, adjustable forces Fk1 through Fkn can be applied to said roll mantle (refer to FIGS. 1A and 2A).

As is shown in FIG. 1A, in the case of reeling drum exchange the reeling drum is supported at both of its axle journals by means of a force $F_1$ directed upwards and additionally by means of forces produced by loading members 14 and 15 which are directed in opposition to the force applied against reeling drum 10 by nip $N_{KV}$, as shown in FIG. 1C. The Pope cylinder 10 is deflected by means of forces $F_{k1} \ldots F_{kn}$ while at the same time the Pope cylinder is deflected at its axle journals 16 so that a linear line pressure pk is maintained in nip $N_{KV}$. Said pressure is illustrated in FIG. 1B. The case illustrated by FIGS. 1A and 1B is analogous to the case illustrated in FIG. A1 for a prior-art Pope-type reel-up.

Figure 2B:
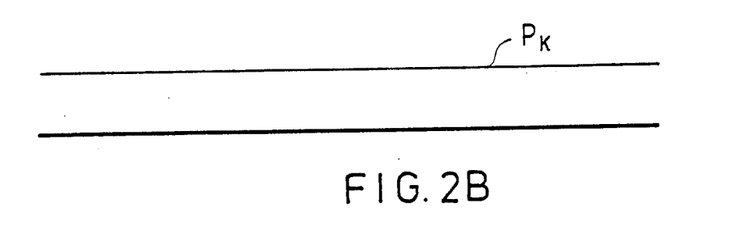
FIG. 2B illustrates the distribution of line pressure in the reel-up shown in FIG. 2A.
Figure 2C:
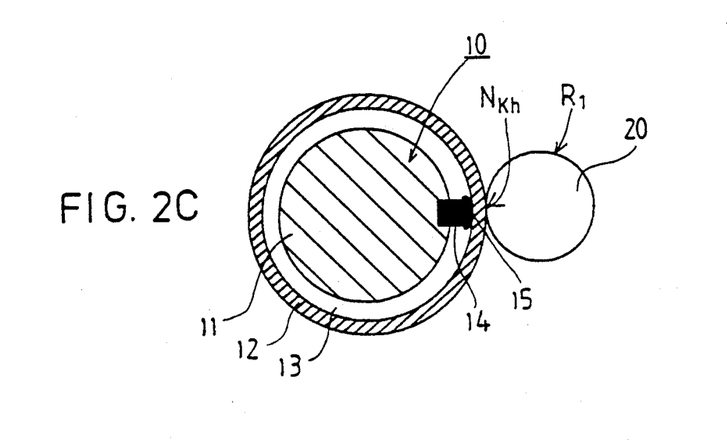
FIG. 2C is a vertical sectional view of the reel-up apparatus illustrate in FIG. 2A.
Figure 3A:
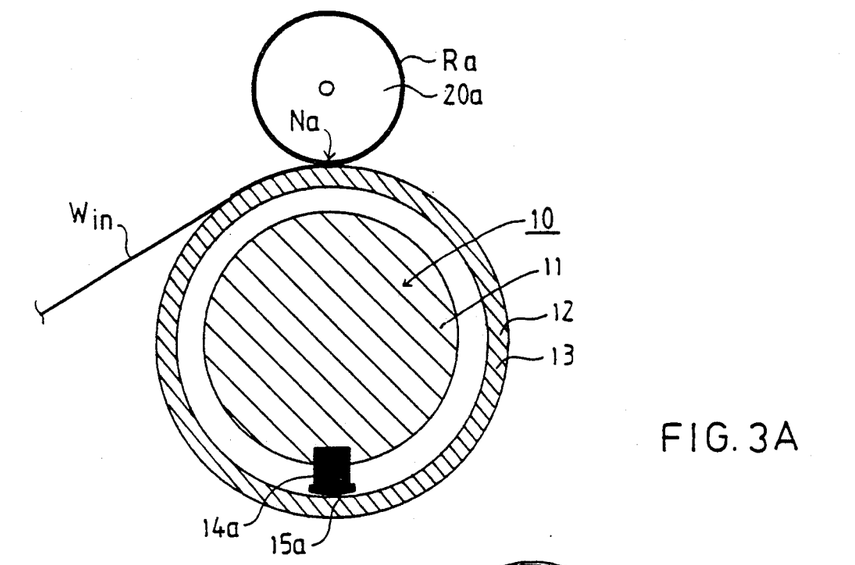
FIGS. 3A, 3B, and 3C show three subsequent different stages of operation of the reel-up method and apparatus in accordance with the present invention.
Figure 3B:
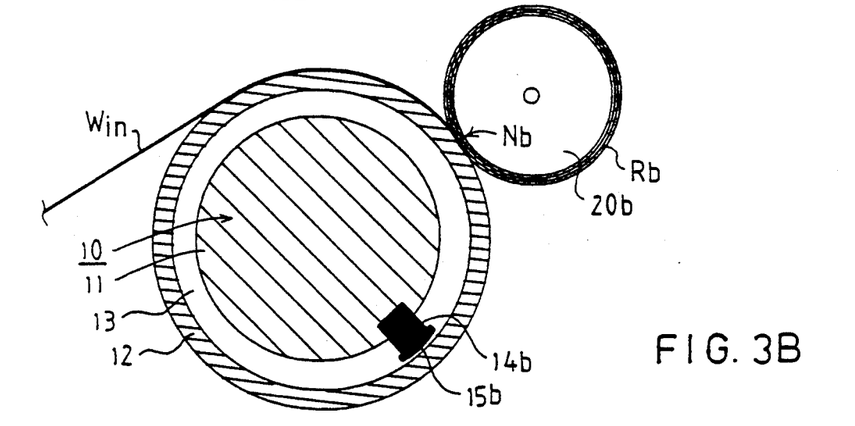
Figure 3C:
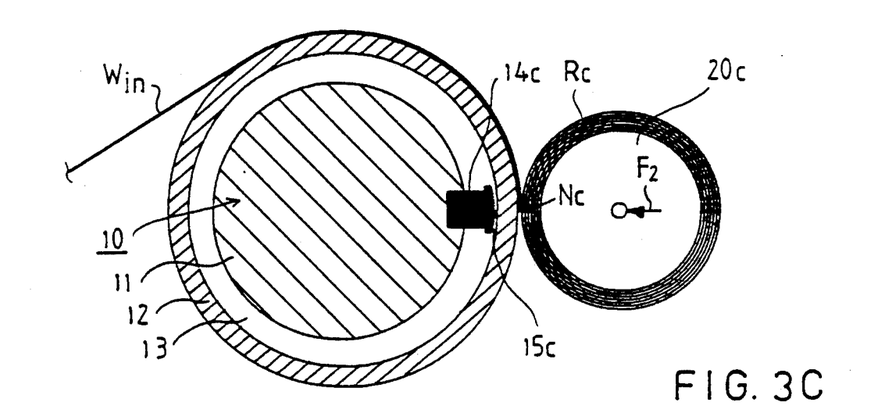

As is shown in FIGS. 2A and 2C, the reeling nip $N_{kh}$ has been shifted to the horizontal center plane of the Pope cylinder 10 while at the same time central axle 11 of Pope cylinder 10 has been rotated by means of particular power units (not shown) so that loading members 14 and 15 have also been shifted to meet the horizontal center plane of nip $N_{kh}$. At this stage, the reeling drum is pressed toward Pope cylinder 10 by forces $F_2$ at both of its axle journals, and a pressure medium is passed into loading members 14 and 15 so that mantle 12 of Pope cylinder 10 is deflected as affected by reeling drum 20 and the roll $R_1$ it supports. Thus uniform line pressure $P_k$, as illustrated in FIG. 2B, is maintained in reeling nip $N_{kn}$ for the arrangement of elements described above. FIGS. 3A, 3B and 3C illustrate the reeling stages mentioned above in part in greater detail such that the stage shown in FIG. 3A corresponds to the stage shown in FIG. 1C and the stage shown in FIG. 3C corresponds to the stage shown in FIG. 2C, while FIG. 3B shows an intermediate stage. For the stage of operation shown in FIG. 3A, web run is in the direction of arrow W-in onto roll $R_a$ formed on reeling drum 20a while line pressure in the reeling nip Na is given a uniform adjustment by means of loading members 14a and 15a.

As for the stage of operation shown in FIG. 3B the reeling nip $N_b$ is shifted downward on the mantle towards the horizontal center plane of cylinder 10, and the central axle of the reeling cylinder 10 has been rotated so that loading members 14b, 15b are moved upward toward said center plane and nip $N_b$. Forces are there applied to place a load on loading members 14b, 15b and to support reeling drum 20b such that uniform line pressure is maintained in the nip $N_b$. In the case illustrated by FIG. 3C, the loading members 14C, 15C have been shifted to the horizontal center plane of cylinder 10 by rotating the axle 11. For the case as described, the reeling drum 20C is loaded at both of its axle journals by means of applied force $F_2$ such that loading member 14C and its gliding face 15C are in direct and opposite contact with the nip $N_c$ so that a uniform distribution of line pressure is maintained at said nip. Also, for the case shown in FIG. 3C, reeling is continued until the roll is completed while the various pressures applied to loading members 14C, 15C and forces $F_2$ acting upon axle journals of the reeling drum 20c are regulated by controlling either the measurement of the radius of roll $R_c$, or another functionally equivalent measurement signal, such that sufficiently uniform line pressure pk is maintained at all times in the nip $N_c$. Furthermore, it is advantageous to adjust the level of line pressure in the nip Nc to an optimal level taking into consideration the factors of roll formation, hardness, and distribution of hardness.

In accordance with the present invention an adjustable-crown Pope cylinder 10 is most appropriately employed comprising a roll mantle 12 having a central axle 11 with axle journals located at both of its ends.

Figure 4:
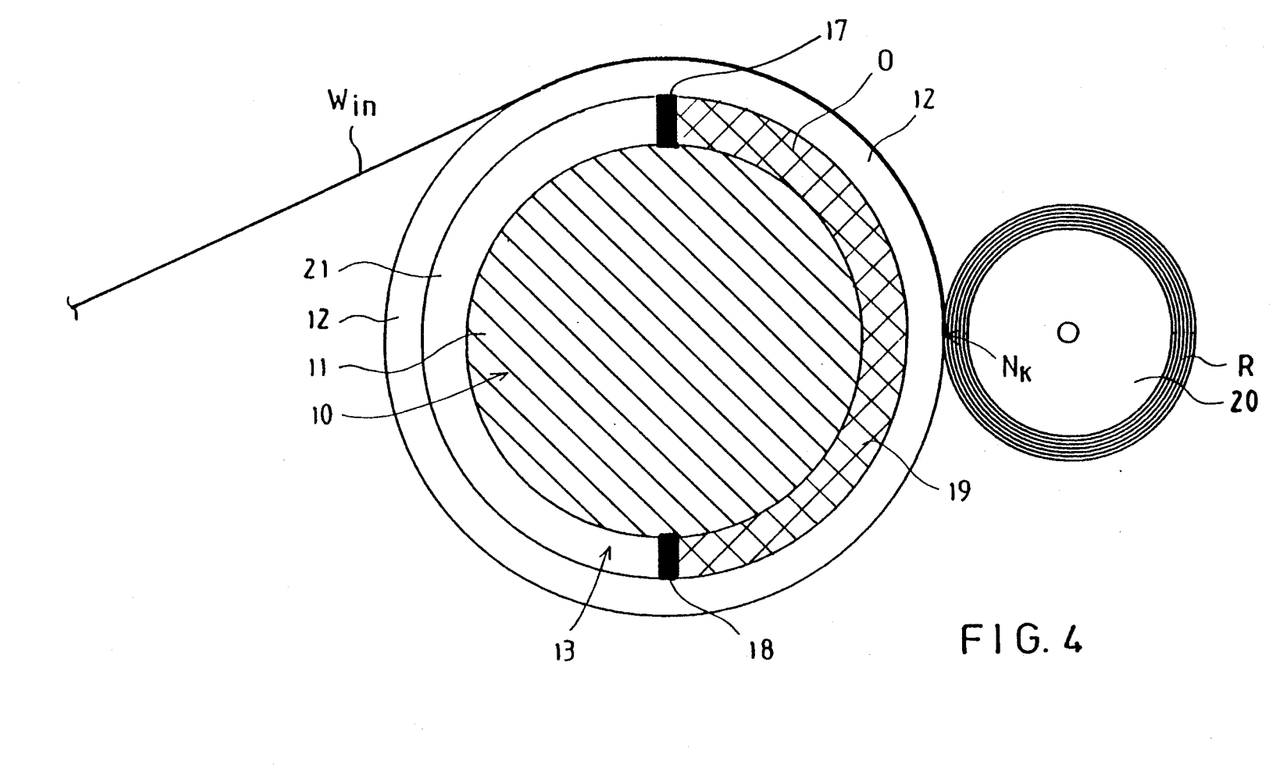
FIG. 4 is a vertical sectional view of another embodiment of the present invention at the stage of reel-up corresponding to FIGS. 2C and 3C.

In FIG. 4, another embodiment of the present invention is illustrated, wherein a particular variable-crown Pope cylinder 10 is employed which comprises a stationary central axle 11 with axle journals at both of its ends for supporting a cylinder mantle for revolution around axle 11. In space 13, formed between the axle 11 and mantle 12, a pressure space 19 has been isolated by means of axial sealing ribs 17 and 18, into which space a pressure medium 0 whose pressure can be regulated is passed. The remaining portion of space 13 outside of pressure space 19 is empty and not loaded by a pressure medium. As a result of the aforementioned construction, a Pope-type reel-up including a floating variable-crown Pope cylinder is provided with means to achieve a uniform distribution $p_k$ of nip pressure at the various stages of reel-up described above.

The stage of reel-up illustrated in FIG. 4 corresponds with the stage of reel-up illustrated in FIGS. 2C and 3C, wherein the roll R grows around reeling drum 20 when the latter is supported on rails 32 by its axle journals.

Figure 6:
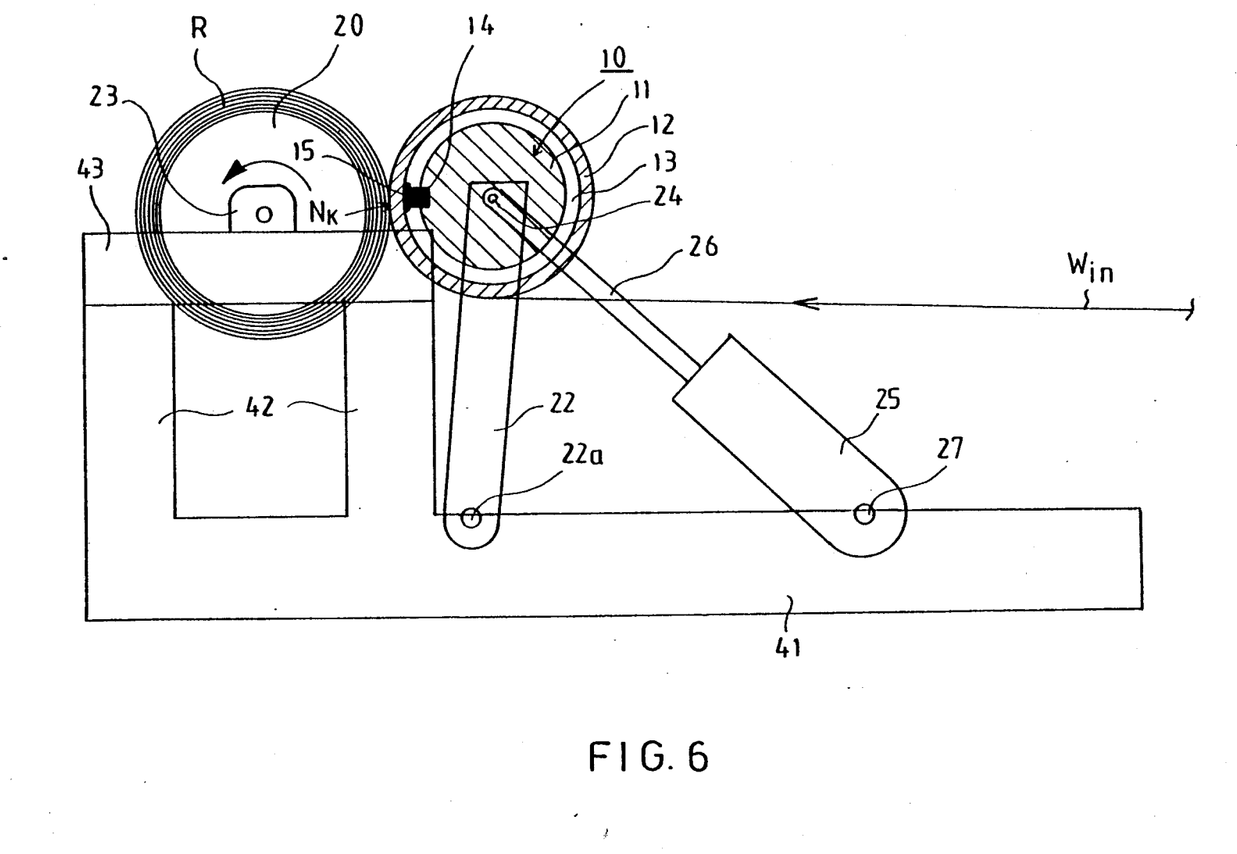
FIG. 6 shows yet another embodiment of a reel-up in accordance with the present invention.

FIG. 6 shows an alternative reel-up to which the invention may be applied. As shown in FIG. 6, the reel-up comprises a frame construction 41 having vertical parts 42 and horizontal parts 43 upon which bearing supports 23 are attached, said bearing supports offering the reeling drum 20 rotatable support at a first position in the reel-up until the roll is completed. The reel-up comprises a reeling cylinder 10 of the variable-crown or adjustable-crown type previously described herein. The web W runs in the direction $W_{in}$ into the reel-up and continues its run approximately a quarter revolution around mantle 12 where it then enters into reeling nip $N_k$ whose line pressure is regulated in accordance with details of the invention. The reeling cylinder 10 is operatively connected to vertical arms 22 by its axle journals 24, said arms being linked, at their lower ends, in connection with frame construction 41 by means of horizontally articulated shafts 22a. The upper ends of vertical arms 22 are controlled by hydraulic cylinders 25, whose piston rods 26 are connected to the axle journals 24 of the reeling drum 10. The lower ends of the hydraulic cylinders 25 are connected to the frame construction 41 by means of horizontally articulated shafts 27. By means of said hydraulic cylinders 25, an appropriate level of line pressure is produced in the reeling nip $N_k$. The distribution of line pressure in the reeling nip $N_k$ is regulated, as is the level of line pressure at the reeling nip $N_k$, by means of hydraulic loading members 14 and 15. Obviously, numerous modifications and variations of the present invention are possible in light of the above teachings. It is therefore to be understood that within the scope of the claims appended hereto, the invention may be practiced otherwise than as specifically described herein.

What is claimed is:

1. A method of operating a reel-up apparatus for reel-up of a paper web wherein said web is formed as a roll comprising a plurality of layers of said web around a reeling drum and wherein the web passes through a reeling nip formed between a reeling cylinder and said drum, and wherein said reeling cylinder further comprises a cylinder mantle which revolves around a central axle of said cylinder, said method comprising the step of adjusting deflection of the cylinder mantle during its revolution so that distribution of line pressure in the reeling nip is controlled in an axial direction, wherein at the initial stage of reel-up the reeling drum is relieved of its own weight at both its ends by means of particularly directed forces, comprising the following steps:

rotating a plurality of loading members away from the reeling nip, positioned at the top of said cylinder, 180°, thus compensating for free deflection of the cylinder mantle resulting in substantially uniform line pressure in the reeling nip;

moving the reeling nip downwardly along the circumference of the reeling cylinder toward its horizontal center plane while, at the same time, the loading members are rotated upwardly toward said plane reducing the distance between said loading members and said reeling nip, whereupon the reeling drum is shifted onto secondary ford means comprised by the reel-up apparatus;

loading the reeling drum at both its ends, at which said axle journals are located, with particularly directed adjustable forces applied by said forks, such that the loading members and the reeling cylinders are in face to face contact, whereby pressure is directed inwardly toward the loading members resulting in uniform line pressure at the reeling nip.

2. The method as set forth in claim 1, wherein said reeling cylinder further comprises axle journals at both ends of its central axle, and wherein said method further comprises the step of adjusting line pressure in the reeling nip by regulation of loading forces applied at said axle journals, and wherein said forces are applied by hydraulic means.

3. The method as set forth in claim 1 and wherein said reeling cylinder further comprises a series of loading members fitted into said mantle for receiving an adjustable pressure medium which operates as a lubricant for both portions of said loading members and for the inner circumference of said mantle during its revolution, and wherein said method further comprises the step of adjusting said pressure medium so that the deflection of the reeling nip is compensated.

4. The method as set forth in claims 1, wherein said reeling cylinder further comprises at least one sealed pressure chamber, containing a pressure medium, is located between said mantle and said center axle, and wherein said method further comprises the step of adjusting said pressure to compensate for deflection of the reeling nip.

5. A method as set forth in claim 1, for the operation of a Pope-type reel-up, apparatus including the steps of pressing the roll to be produced against said cylinder which rotates at a circumferential speed corresponding to the reeling speed of the drum, thus bring the drum into contact with said cylinder until said roll is fully completed to the dimensions desired, whereupon the roll is disengaged from nip contact, thus bringing a new reeling drum into nip contact with said cylinder to form a new roll from the paper web.

6. A method as set forth in claim 1, and wherein the steps thereof are applied to center-driven reel-up devices in reel-ups provided with carrier rolls or an equivalent set of carrier belts for supporting the paper web roll.

* * * * *